United States Patent [19]

Kern et al.

[11] 4,456,271

[45] Jun. 26, 1984

[54] TOOL HOLDER WITH CLAMPED POSITION LATCH

[75] Inventors: Leon O. Kern; James G. Zeilinger; Gerald E. Mueller, all of Frankenmuth, Mich.

[73] Assignee: Houdaille Industries, Inc., Ft. Lauderdale, Fla.

[21] Appl. No.: 385,546

[22] Filed: Jun. 7, 1982

[51] Int. Cl.[3] .............................................. B23B 31/04
[52] U.S. Cl. ...................................... 279/91; 279/1 B
[58] Field of Search ....................... 409/232; 408/239; 279/91, 90, 101, 1 B, 1 C, 75, 97

[56] References Cited

U.S. PATENT DOCUMENTS

| | | | |
|---|---|---|---|
| 2,731,273 | 1/1956 | Edens | 279/97 X |
| 2,990,188 | 6/1961 | Better et al. | 279/75 |
| 3,456,957 | 7/1969 | Koch | 279/91 |

FOREIGN PATENT DOCUMENTS

| | | | |
|---|---|---|---|
| 2051504 | 7/1971 | Fed. Rep. of Germany | 279/1 B |
| 2318372 | 10/1974 | Fed. Rep. of Germany | 279/1 B |

OTHER PUBLICATIONS

175 Kelch–No Fix Technical Details, Kelch & Co., Werkzeugmachinen Fabrik, 706 Shorndorf.

*Primary Examiner*—Z. R. Bilinsky
*Attorney, Agent, or Firm*—Hill, Van Santen, Steadman & Simpson

[57] ABSTRACT

A tool holder assembly is provided with a spindle adapter socket member having a threaded end with a nut threaded thereon, the nut having a clamping configuration at a bottom thereof for clamping a tool adapter to the socket. The socket member is provided with an outer diameter toothed ring and the nut is provided with a mating toothed member movable between toothed ring engaging and tooth ring disengaged positions to lock the nut in fixed rotational position to the socket member.

2 Claims, 11 Drawing Figures

TOOL HOLDER WITH CLAMPED POSITION LATCH

BACKGROUND OF THE INVENTION

1. Field of the Invention

This invention relates to tool holder assemblies and, more particularly, to a tool holder assembly having means to lock the clamping nut in clamped position on the socket member.

2. Prior Art

Tool utilizing devices, particularly machine tools, having tool spindles frequently employ quick change chucks or tool holders in which the tool can be quickly inserted and released. In a known format for such tool holders a spindle attached socket member is provided with a cylindrical end portion having a tapered socket opened to the end. The cylindrical portion has external threads and a nut assembly is received over the cylindrical end and engaged with the external threads. A tool adapter is provided in which the tool is secured projecting from an end of the adapter. Mating projections and recesses on the tool adapter, socket member and nut cooperate to allow the tool adapter to be quickly inserted in the socket, clamped therein, unclamped therefrom and removed from the socket. Various combinations of clamping means have been known to the art and include, for example, radial projections on the tool adapter alignable with radial slots in an inturned end flange of the nut and slots in the peripheral wall of the socket member and the reverse thereof, i.e. flats on a projecting flange on the tool adapter alignable with radially inwardly projecting clamping lugs on the nut and keys carried by the inner diameter of the peripheral wall of the socket member. In the first instance, the nut is movable from a position where the nut slots are aligned with the socket member slots and the nut flange is spaced from the end of the socket, to allow insertion of the tool adapter, to a clamped position at which the nut slots are rotated with respect to the tool adapter radial projections, now received snuggly in the socket member slots and where the nut flange is axially moved towards the socket to engage the underside of the tool adapter projections. In the latter embodiment, the nut is rotatable from a position where the nut clamping lugs are aligned with the keys of the socket member, at which position the flats of the tool adapter allow insertion past the clamping lugs into engagement with the keys, the nut then being rotatable to a clamping position where the lugs are circumferentially displaced from the keys and engage the underside of the tool adapter flange to seat it in the socket. Other variations are also known where the clamping is done by an independent member carried by and rotatable with respect to the nut, etc. Such devices are shown, for example, in U.S. Pat. Nos. 2,719,722; 3,663,028; 3,730,540; and 4,298,208.

In a common variant of such prior systems, spring means are used to urge the nut from the unclamped position to the clamped position with abutment and lock means provided to maintain the nut, against the spring, in the unclamped tool insertion and removal position. The nut threads are generally chosen to be of a hand such that when the spindle is rotating in its primary tool using direction the nut will tend to tighten on the spindle to maintain proper clamping force.

Although such prior art tool holder assemblies have achieved widespread success, recent developments in machine tools, such as, for example, high speed tooling, increased machine tool feed rates, emergency braking, and bi-directional spindle rotation, can lead to problems particularly where the spring force of the automatic locknut in conjunction with mechanical energy stored by the elastic deformation and frictional resistances of the nut threads with or without spring actuating means is not adequate to maintain a desired clamping force. Clamping force may also be lost because of unbalanced dynamic forces and also through vibrations produced by the machine tool operations and from reverse rotation, and also from instantaneous braking.

SUMMARY OF THE INVENTION

This invention provides such a locking mechanism. It will be understood that when we use the term "clamped position", that the actual position of relative rotation from the unclamped position to the clamped position can vary for different adapters and that the clamped position is not, at all times, a precisely predetermined position of angular relationship between the nut and socket member. Thus, the term "clamped position" when used herein represents that position at which any given tool adapter is securely clamped to the socket member. Moreover, it should be understood that the invention described herein is not limited to the particular single spindle member, single tool adapter member or adapter and single nut with which it is described. For example, such features as tool adapter radial projections v. tool adapter flats or slots, integral clamping ring v. separable clamping ring, clamping spring v. manual nut rotation, ejector systems v. no ejector systems, variably positionable unclamped locking position mechanisms v. fixed position unclamped position locking mechanisms, etc., are all matters of individual design choice in any given tool holder assembly and the clamped position lock means of this invention are believed utilizable with all possible variations of such choices.

This invention provides a clamped position lock assembly which is selectively engageable and disengageable over a range of relative rotational positions of the clamping nut and socket member. The basic lock mechanism includes teeth or serrations on the outer diameter of the socket member and mating toothed or serrated members carried by the nut together with means to engage and disengage the respective toothed or serrated members. Although the term "gear" or "toothed" members will be used herein, it is to be understood that such term refers to any similar engageable and disengageable positive locking surfaces.

In a preferred embodiment illustrated, the locking mechanism consists of a gear ring pinned to the outer diameter of the socket member having radially outwardly projecting gear teeth. A pivoted pawl having radially inwardly projecting gear teeth is carried by the nut and is spring urged to pivot against the socket carried gear ring. A projection of the pawl extends outwardly beyond the outer diameter of the nut in an area to be engaged by a spanner wrench being used to tighten or loosen the nut so that application of the wrench automatically depresses the projection into the nut thereby pivoting the teeth of the pawl out of contact with the gear ring against the spring force. By use of gear teeth extending circumferentially throughout a substantial portion or the entirety of the circumference of the socket member, the nut is angularly lockable with respect to the socket member so as to accomodate different degrees of bottomed insertion of the tool adapter into the socket and/or of differing flange or projection thicknesses on the tool adapter. In this preferred embodiment, the mass of the pawl and the position of the pivot are chosen so that the centrifical force or rotation of the locked spindle member and nut will increase the lock force engagement of the pawl with the gear ring.

In other preferred embodiments, the gear ring may be integral with said socket member, the pawl may assume different shapes including a torsion spring biased eccentric mounted gear having an actuator projecting radially therefrom and a radially movable shoe member actuated by an axially movable camming member having a spring biased ball lock.

It is therefore a principal object of this invention to provide an improved, quick change tool holder.

It is another, and more specific object of this invention to provide a quick change tool holder having means to lock the tool clamping member in clamped position with respect to the socket member.

It is yet another, and more particular object of this invention to provide an improved quick change tool holder utilizing a spindle carried socket member and a threadingly engaged clamping ring nut member mutually rotatable between clamped and unclamped positions with lock means effective to lock the clamp ring member at a selected clamp position by means of mating engageable gear teeth carried respectively on the socket member and the clamp ring nut.

It is yet another, and more specific object of this invention to provide a clamping position lock for quick change tool holders for locking the clamping ring at a variable angular clamping position with respect to the spindle carried member, the lock being engageable over a range of relative angular positions of the nut and spindle member.

It is yet another, specific object of this invention to provide a clamped position lock for quick change tool holders which is released by application of a spanner wrench to the clamp nut for tightening or loosening of the nut.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figure 1:
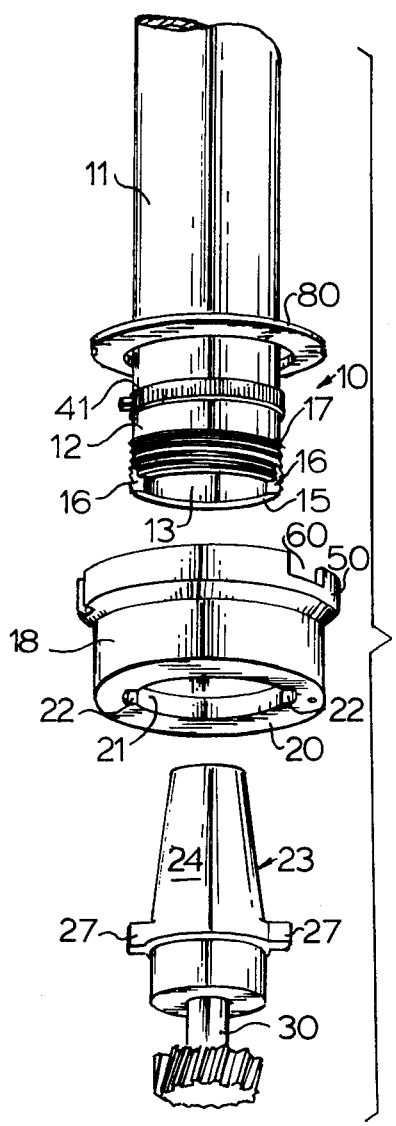
FIG. 1 is a fragmentary exploded perspective view of a collet assembly according to this invention showing a spindle carried socket member, a clamp nut, a tool adapter and a tool.
Figure 2:
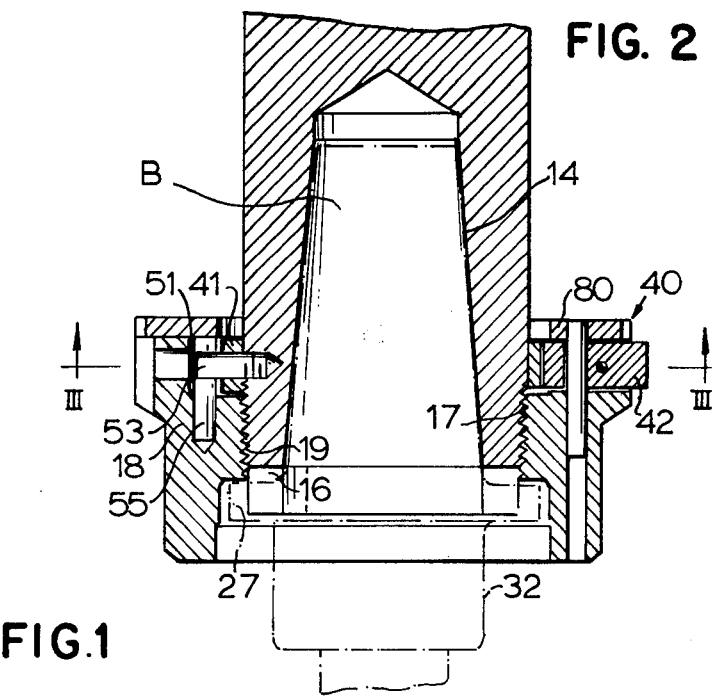
FIG. 2 is a fragmentary cross-sectional view of the assembled socket member and clamping nut.

As best illustrated in FIG. 1, the tool holder assembly 10 of this invention consists of a socket member or spindle adapter 11 which is either formed as a portion of the spindle or is affixable to a spindle. The socket member 11 includes an axial end portion 12 having a socket bore 13 open to the end thereof. As illustrated in FIG. 2, the socket bore 13 has a tapered inner wall 14. The ring-like peripheral wall 15 at the axial end 12 is slotted as at 16 from the inner diameter of the socket to the outer diameter, the slots extending axially back from the free end a distance determined by the seating depth and driving keys of the tool adapter. The end 12 is threaded as at 17 for receipt of a clamping nut 18, the clamping nut having mating inner diameter threads 19. The clamping nut has an axial end 20 having an inturned flange 21 provided with opposed radially outwardly extending slots 22 which are alignable with the slots 16. The tool adapter 23 has a frustoconically tapered portion 24 for receipt in the socket 13 and has a pair of projecting driving lugs 27 receivable through the slots 22 and into the slots 16 to establish a driving relationship with the socket member 11. A tool 30 may be affixed to the tool adapter and project axially therefrom.

When the slots 22 and 16 are aligned the tool adapter 23 is insertable upwardly into the socket 13 as shown by broken lines at 32 of FIG. 2. When inserted, the driving lugs 27 project into the slots 16 and are engageable by the sidewalls of the slots 16 to establish a rotational driving relationship. Thereafter, rotation of the nut 22 on the mating threads 17 and 19, will move the unslotted portion of the flange 21 into underlying relationship with the driving lugs 27 and axial movement of the nut by reason of the pitch of the threads 17, 19 will clamp the tool adapter into the socket 13.

In order to maintain the clamped position, a lock mechanism 40 is provided. The lock mechanism 40 consists of an outer diameter toothed gear ring 41 or other serrated band on the socket member 11 and a mating gear teethed pawl 42 carried by the nut 18.

Figure 3:
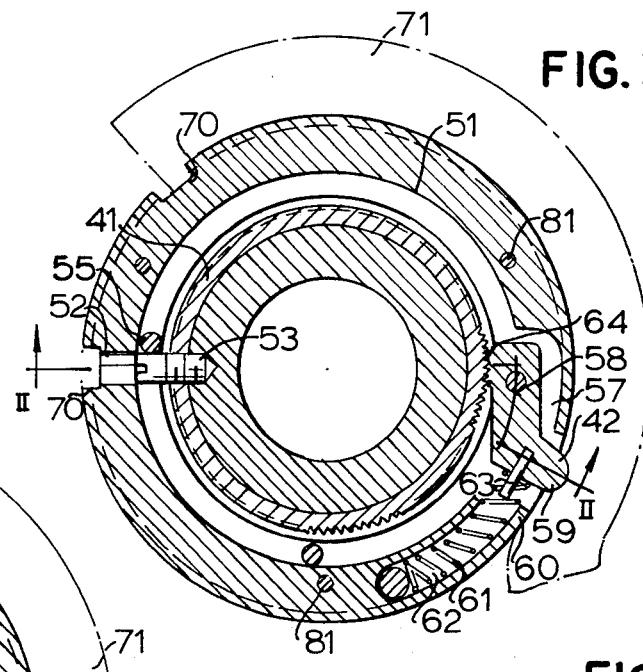
FIG. 3 is a cross-sectional view taken along the lines III—III of FIG. 2 illustrating the nut and spindle member in unclamped relation.
Figure 5:
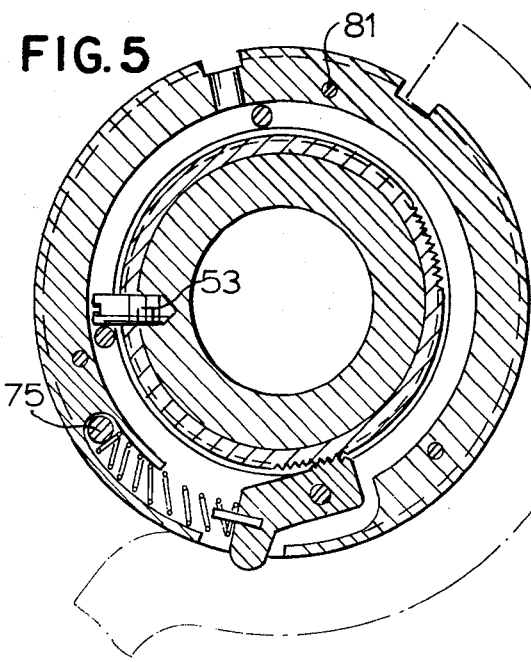
FIG. 5 is a view similar to FIG. 3 illustrating the maximum nut rotation position.

In order to provide room for the lock assembly, the nut 18 has a diameter increasing flared end 50 on the top end of the nut 18 opposite the flanged end 20 provided with an inner diameter counter bore 51 which surrounds the gear ring 41. An open bore 52 through the peripheral wall of the nut open to the counter bore provides access for a lock pin 53 which pins the gear ring in place on the socket member 11 and which further provides an abutment stop for engagement with a vertical pin 55 carried by the nut projecting axially in the counter bore. This limits relative rotation of the socket member 11 and nut to provide a limit stop at the slot aligned unclamped position as illustrated in FIGS. 2 and 3 and a limit stop for end of clamped stroke as illustrated in FIG. 5. The counter bore is increased in diameter at one circumferential area 57 to provide a pocket for receipt of the pawl 42 which is pivoted as at 58. The pawl 42 has an end tang 59 which extends out of the nut beyond the periphery thereof through a slot opening 60. The pawl is biased by spring 61 received in the circumferential bore 62 in the wall of the nut. A pilot pin 63 on the pawl 42 maintains the spring in engagement with the pawl.

Figure 4:
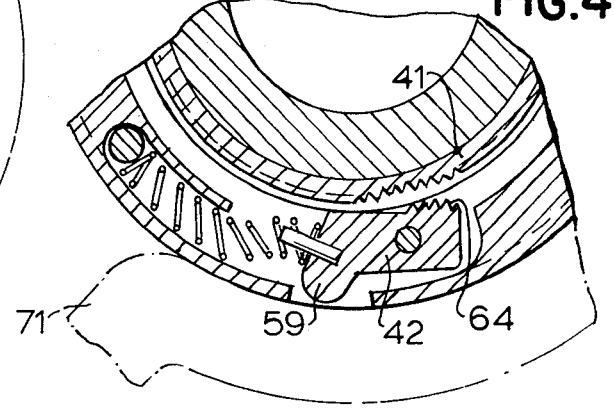
FIG. 4 is a fragmentary enlarged sectional view similar to FIG. 3 in showing disengagement of the locking mechanism by application of a spanner wrench.

As will be seen from FIG. 3, the pawl is therefore biased to rotate about the pivot 58 to have the toothed end 64 of the pawl in engagement with the gear ring 41 thereby providing a positive lock between the socket member and nut. The lock is shown in FIG. 3 as being engaged in the unclamped position and in FIG. 5 as being engaged in the clamped position. In order to rotate the nut from the unclamped to the clamped position and in reverse, the outer periphery of the nut, in the axial area of the pawl, is provided with notches 70 for receipt of a spanner wrench 71 shown in phanthom in FIGS. 3 and 5. Because of the projecting end 59 of the pawl, when the spanner wrench is in place, its inner diameter will engage the projection 59 and rotate the pawl, about the pivot 58 in opposition to the spring bias as shown in FIG. 4. This will disengage the toothed end 64 of the pawl 42 from the gear ring 41 thereby freeing the nut for rotation about the socket member. By providing properly positioned notches 70, it will be insured that the pawl projection 59 will be engaged by the spanner wrench in both directions of rotation. It will, of course, be understood that in those instances where a spanner wrench is not necessary, the operator's fingers can engage the pawl projection and manually depress it to release the lock.

As is illustrated in FIG. 5, if desired, an additional abutment pin 55 may be provided for abutment by the pin 53 at the fully clamped position or, if desired, the pin 55 can be spaced beyond the normally expected fully clamped position to provide a limit to clamping rotation movement of the nut with the expectation that normally the nut will not be rotated that far before sufficient resistance to further rotation due to the clamping of the drive lugs 27 and the full seating of the tool adapter in the socket is obtained.

In order to prevent entrance of contaminants into the counter bore area and the spring bore which could otherwise interfer with the movement of the pawl, and to provide support for the pawl pivot, a cover plate 80 may be provided for the counter bore and be affixed to the nut by screws 81.

Figure 6:
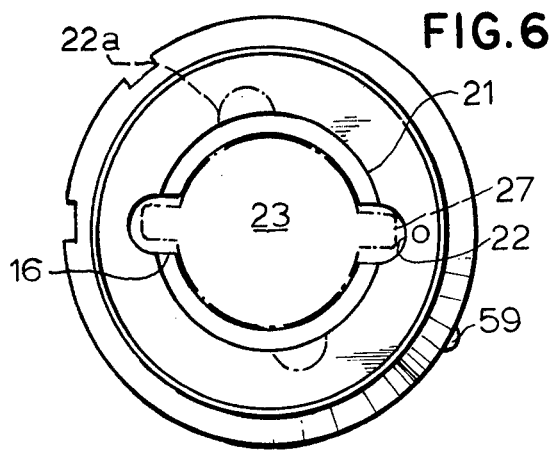
FIG. 6 is an end plan view of the assembly of FIG. 2 showing, by broken lines, the clamped position of circumferentially offset slots.

As shown in FIG. 6, the inner diameter of the flange 21 is smaller than the outer diameter of the driving lugs 27 while the slots 22 are of larger inner diameter. In this manner, the driving lugs 27 can be inserted through the slots 22 into the slots 16 for driving engagement. Thereafter, as shown by the broken lines 22a, upon rotation of the nut the driving lugs 27 will be engaged by the flange 21 to maintain the tool adapter 23 in the socket with the nut in the clamped position.

Figure 6A:
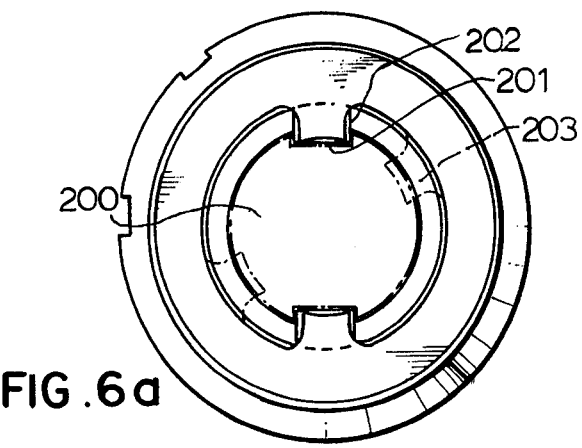
FIG. 6a is a view similar to FIG. 6 illustrating a variant of FIG. 6 where the nut is provided with lugs and the tool adapter with flats.

FIG. 6a shows the principal variant of FIG. 6 where the tool adapter 200 is provided with spaced flats 201 to engage keys 202 carried by the socket member. Lugs 203 carried by the clamping nut are rotatable from a position aligned with the keys to clamping positions underlying a tool adapter flange spaced from the flats.

Figure 7:
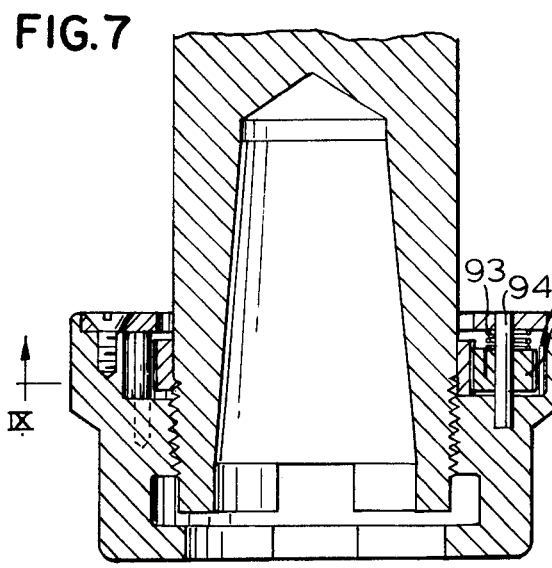
FIG. 7 is a view similar to FIG. 2 illustrating a modified form of this invention.

FIG. 7 illustrates a modified form of the lock mechanism where an eccentric pivoted gear wheel 90 is mounted in the counter bore 51a in an enlarged area 57a. The gear wheel 90 has an actuator or tail member 91 affixed thereto which is accessible through an opening 60a in the sidewall of the nut. A torsion spring 93 positioned around the pivot 94 of the gear wheel 90 urges the gear wheel to engage the gear ring 41. Depressing the actuator 91 through the slot 60a will release the lock engagement of the gear wheel 90 and gear ring 41. In the embodiment illustrated, the actuator 91 does not extend circumferentially beyond the outer diameter of the nut. In such an assembly the spanner wrench, if desired, can be provided with a radially inwardly extending projection to extend into the slot 60a to actuate the activator. It is to be appreciated that in both the embodiments of FIGS. 1 through 6 and FIGS. 7 and 9, that circumferential force generated by rotation of the collet will increase the grip force of the lock.

Figure 8:
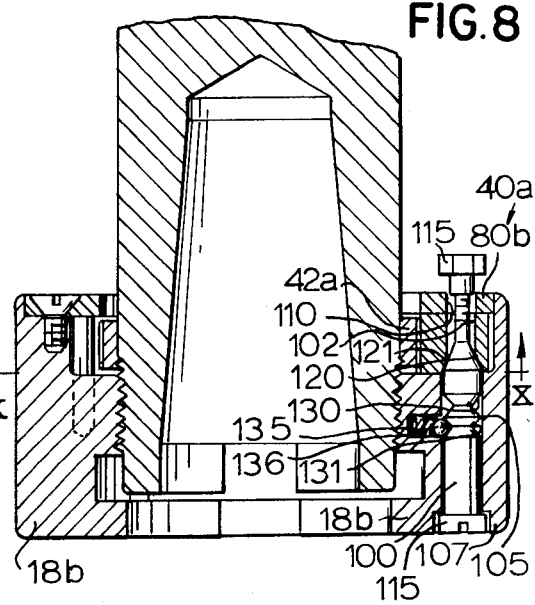
FIG. 8 is a view similar to FIG. 2 illustrating yet another modified form of this invention.
Figure 9:
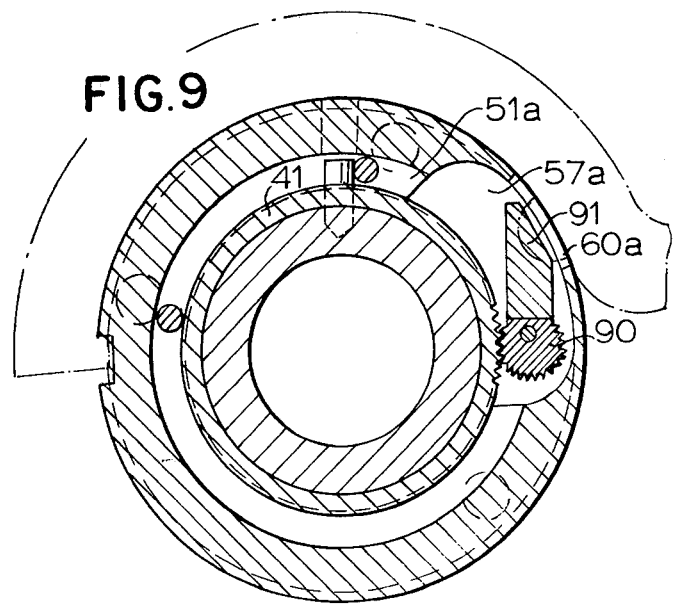
FIG. 9 is a cross-sectional view similar to FIG. 3 of the embodiment of FIG. 7 taken along the lines IX—IX.
Figure 10:
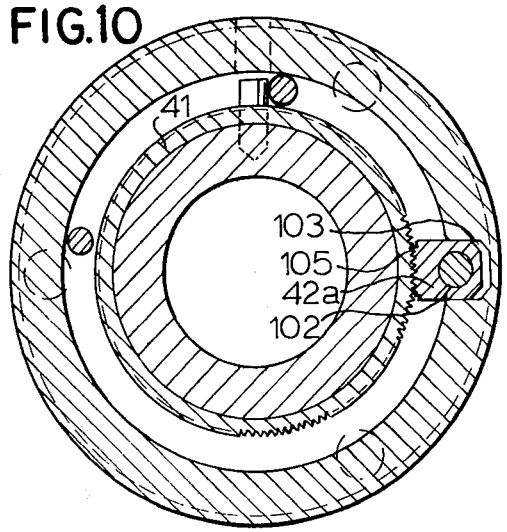
FIG. 10 is a cross-sectional view similar to FIG. 3 of the embodiment of FIG. 8 taken along the lines X—X.

FIGS. 8 and 10 show a third embodiment of this invention wherein the locking mechanism 40a is provided by radially movable pawl member or shoe 42a actuated by an axially movable actuator 100 which is manually operable. The shoe 42a consists of a substantially rectangular member having a bore 102 therethrough, the shoe being received in a blind bore 103 in the wall 104 of the nut open to the inner diameter and opposite the gear ring 41. The shoe has a radially inner face 105 having mating engageable gear teeth formed thereon. The bore 103 is aligned with a vertical bore 105 in the nut 18b, the vertical bore being opened at the bottom axial end 107 of the nut and at the bottom of the bore 103. As in prior embodiments, a cover ring 80b may be utilized. The cover ring has a bore 110 aligned with the axial bore 105. The actuator 100 is received in the aligned bores and projects through the bore 102 of the shoe. The actuator 100 is provided with enlarged axial ends 115 larger than the bore 105 and cover ring bore 110 and with a smaller varying diameter mid-section. The mid-section includes a frustoconical axial end opening 121 of the bore 102. Thus, when the actuator 100 is in the position illustrated in FIG. 8, the mating of the frustoconical section 120 of the actuator with the frustoconical bore 121 of bore 102 will cam the shoe 42a radially inwardly into contact with the gear ring and retain it in that position.

However, movement of the actuator 100 to a lowered position will provide clearance between the walls of the bore 102 and the actuator allowing the shoe 42a to move radially outwardly in the blind bore 103 thereby disengaging the shoe from the gear ring.

In order to maintain the actuator in either the gear ring engaging or disengaging position, the actuator is provided with a pair of spaced circumferential grooves 130 and 131 which are engageable by a spring backed ball detent assembly 135 received in a blind bore 136 in the nut 18b.

It will therefore be understood that in the embodiment of FIGS. 8 and 10, when the actuator is pushed into the top projecting position shown in FIG. 8, that the teeth of the shoe will engage the gear ring locking the nut against circumferential rotation relative to the spindle member. However, when the locking mechanism is disengaged by pushing the actuator to its full down position, the shoe will be free to radially move due to the clearance between the actuator and the wall of the bore 102. In this position, attempted rotation of the nut will cause the shoe to retract radially outwardly by reason of the teeth of the ring gear pushing the pawl outwardly.

It will be appreciated that in all embodiments, although a 360° gear ring has been shown, that the gear teeth need only cover that portion of the circumference of the socket member where it is desirable to provide engagement with the locking member. In some instances, where it is only desired to lock in the clamped position, a short arc gearing may be provided. However, where it is desired to lock in both the clamped and unclamped positions, or where a greater degree of possible circumferential spacing in the clamped position is desired, the gearing on the socket member may extend a greater portion or the entirety of the circumference of the socket member. Many tool holder assemblies are designed to be substantially infinitely adjustable to accomodate differing types of tool adapters and for this reason the use of a 360° gear ring is beneficial in that it provides for clamped and unclamped positions of the locking pawl to lie at any point around the circumference.

Furthermore, although the gear ring 41 has been shown as a separate piece, in specific embodiments, it may be desired to form the gear ring on the body of the socket member. Although we have herein shown different embodiments of the locking member, including different designs for the locking pawl, it is to be understood that these are not exclusive and that other embodiments and designs may be utilized including, for example, designs which use knurling rather than gearing type serrations. However, serrations of the type which provide a positive mechanical interfit are preferred and, further, those designs which allow wide variations of the point of actual lock contact are preferred so as to provide a substantially infinite or extremely large number of possible different angular lock positions between the nut and socket member.

Although the teachings of our invention have herein been discussed with reference to specific theories and embodiments, it is to be understood that these are by way of illustration only and that others may wish to utilize our invention in different designs or applications.

We claim as our invention:

1. A quick change tool holder for tools comprising: a socket member having a tapered inner bore open to an axial end thereof, external threads on the socket member adjacent the axial end, a clamping ring for clamping a tool adapter in said socket, said clamping ring operatively connected to said external threads and rotatable and axially movable with respect to the socket member, a tool adapter having a shaft received in the socket, means on the tool adapter, socket member and clamping ring for establishing tool adapter clamped and unclamped positions with respect to the socket member with the tool holder being freely insertable in and removable from the socket member in the unclamped position and being axially and rotatably secured to the socket member in the clamped position, first lock means operatively associated with the clamping ring for rotation therewith and second lock means associated with the socket member for rotation therewith, said lock means engageable with one another at the clamped position to prevent relative rotation of the clamping ring and socket member and being selectively disengageable to allow such relative rotation, the first lock means including a radially movable pawl means operatively associated with the clamping ring and the second lock means including serrated surface means carried by said socket member, said serrated surface means lying at an outer diameter of portions of the socket member, the pawl, when the clamping ring is in the clamped position lying radially opposed to the serrated surface means and axially aligned therewith, the pawl having a serrated inner diameter surface for engagement with the serrated surface means, the pawl being pivoted about an axial pivot with the pawl inner diameter surface movable radially inwardly and radially outwardly with respect to the serrated surface means, spring means urging the pawl to pivot in a direction to cause the pawl surface to engage the serrated surface means, an engagement surface on said pawl on a side of the axial pivot opposite the pawl inner diameter surface, tool means for engaging the clamping ring to rotate the same with respect to the socket member, means for causing engagement of the tool means with the engagement surface to pivot the pawl about the axial pivot automatically when the tool is applied to the clamping ring to disengage the lock means.

2. The device according to claim 1 wherein the tool is a spanner wrench and the engagement surface projects beyond an outer diameter of the clamping nut in the plane of attachment of the spanner wrench to the clamping ring, the clamping ring being provided with a spanner wrench receiving sockets circumferentially spaced from the projection of the engagement surface beyond the outer diameter of the clamping ring.

* * * * *